April 14, 1970  S. G. CARLISLE  3,505,745
METHOD OF TEACHING THE USE OF BUSINESS MACHINES
Filed May 4, 1967
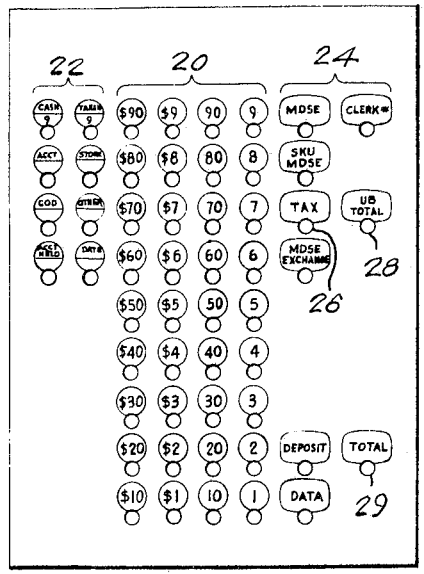
FIG. 2
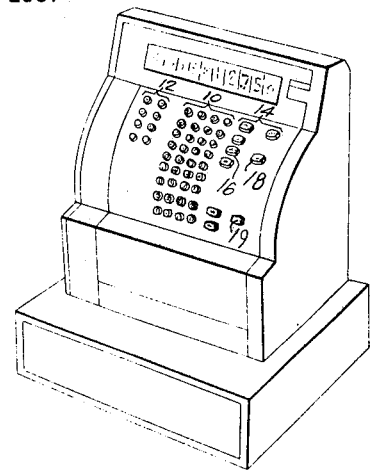
FIG. 1
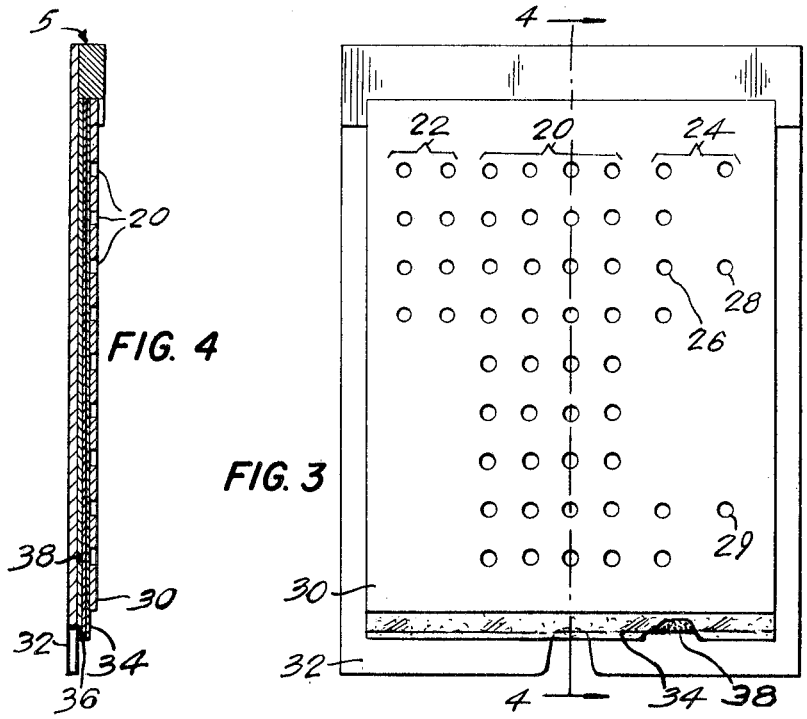
FIG. 4
FIG. 3
INVENTOR
Shirley Gillian CARLISLE
ATTORNEY

United States Patent Office 3,505,745
Patented Apr. 14, 1970

3,505,745
METHOD OF TEACHING THE USE OF BUSINESS MACHINES
Shirley Gillian Carlisle, Pierrefonds, Quebec, Canada, assignor to The Eaton T. Company Limited, Toronto, Ontario, Canada
Filed May 4, 1967, Ser. No. 636,165
Int. Cl. G09b 19/00
U.S. Cl. 35—5                                        1 Claim

ABSTRACT OF THE DISCLOSURE

A stencil superimposed on a perpetual writing device. The stencil includes holes corresponding to the keys on a business machine which is being taught. The student simulates an operation by marking the perpetual writing device through the holes in the stencil corresponding to the keys he or she would punch on the machine.

---

This invention relates to a teaching device and particularly to a teaching device suitable for teaching the manipulation of business machines.

The cash registers used in stores have, over the past few years, become increasingly complicated in design and operation and large department stores have found it desirable to provide organized instruction on the use of such machines. Similarly, other forms of business machines have also become more complex and, to insure that the operator fully understands the manner in which the machine should be operated for best results, instruction is necessary.

According to one aspect of the present invention, there is provided a teaching device to aid such instruction, the teaching device comprising a stencil sheet having holes therein corresponding in location to the keys and other controls of the business machine the use of which is being taught, and a writing device of the perpetual type beneath the stencil sheet whereby the writing device can be marked through the holes in the stencil sheet.

According to a further aspect of the invention there is provided a method of teaching the use of business machines comprising marking a writing device of the perpetual type through the holes of the stencil sheet which holes correspond in position to the keys and other controls of the business machine.

For a better understanding of the invention, reference will now be made to the accompanying drawings in which:

FIGURE 1 is a perspective view of the business machine, in this case a cash register, use of which is to be taught.

FIGURE 2 is an elevational view of one embodiment of the stencil sheet.

FIGURE 3 is a front elevation of the teaching device including a modified stencil sheet on a writing device.

FIGURE 4 is a cross section on the line 4—4 of FIGURE 3.

Referring firstly to FIGURE 1, there is shown a cash register such as is used in large department stores. The cash register includes a plurality of amount keys 10 which are punched to indicate the price of the article being purchased. It also includes a set of code keys 12 on the left of the amount keys 10. These code keys 12 are punched with each amount to indicate the type of sale. After the appropriate keys 10 and 12 have been depressed, a suitable operating or motor key 14 is also depressed to register the computation. To add the tax to this amount, the keys 10 representing the amount of tax, are depressed and then the key 16 in the operating key 14 group is depressed. To add the amount of the purchase and the tax thus achieving a total, a sub-total key 18, or, if the purchase is complete, a total key 19 of the operating key 14 group, is then depressed. For proper functioning of the cash register, it is essential that the keys and other controls are activated in the proper order.

The teaching device 5, illustrated in FIGURES 2 and 3, includes a stencil sheet 30 and has holes 20 corresponding in shape and location to the amount keys 10, holes 22 corresponding in location to code keys 12 of the cash register, holes 24 corresponding to the operating keys 14, hole 26 corresponding to the tax key 16, and holes 28 and 29 corresponding to the sub-total and total keys respectively of the cash register.

The stencil sheet in FIGURE 2 is shown with the holes identified, while the one shown in FIGURE 3 shows no identification marks. The one shown in FIGURE 2 can, of course, be used initially for practice while the stencil sheet in FIGURE 4 can be used for tests and the like.

The teaching device 5 also includes a writing device of the perpetual type, popularly known as a "magic slate," as seen in FIGURES 2 and 3, and includes a backing sheet 32 of stiff cardboard, a sheet 34 of transparent plastic material which is flexible but sufficiently strong to resist scratching, tearing and other degrading surface disfigurations when a pointed writing instrument is applied thereto, and a sheet 36 of a white plastic material. A layer 38 of a black wax substance having properties permitting it to adhere to the sheet 36 when pressure is provided on the sheet 34. The sheets 34 and 36 and the layer 38 co-operate in conventional manner, that is, when a sharp writing implement is pressed upon the exposed surface of the sheet 34, the pressure causes the sheet 36 to be adhered to the backing 38 whereby a black line is traced out by the path of the writing implement. The black line can be obliterated by separating the sheet 36 from the layer 38.

In use of the device the person being taught how to operate the cash register is asked to ring up, for example, a purchase of $44.00 including the necessary tax and having a code "XX" on the price ticket. To do this, the student uses a sharp instrument and marks the writing device, for example, as indicated in FIGURE 2. Thus by inserting the letters A, B, C, D, and so on, in the appropriate holes of the stencil he or she can indicate the order in which the various controls should be pressed to obtain the desired result. Upon removing the stencil and showing the writing to the person in charge of tuition, that person can readily see whether the buttons etc., would have been pressed in the right order. The lettering on the writing device can be erased in conventional manner by separating the sheet 21 from the backing 22 so that the device is ready for re-use. When practicing, the writing device should be erased after each operating key hole 24 has been marked since each time such a key 14 is depressed on the register, an operation is complete. It is necessary to erase such an operation since the key holes must be cleared for the next operation.

As mentioned above, the device and method according to the present invention are suitable for use in conjunction with any form of business machines having keys which must be depressed for tubulating or other purposes. However, the arrangement of the apertures in the stencil sheet must correspond to the control arrangements of the business machine the use of which is being taught.

I claim:

1. A method of teaching the use of a business machine such as a cash register wherein said machine includes three sets of keys including a code key set, an amount key set and an operating key set, comprising the steps of selecting a stencil sheet having holes defined therein representing the code key set, the amount key set and the operating key set, superimposing the stencil sheet on a writing device of the perpetual type, simulating an operation of the business machine by first marking the perpetual writing device with a stylus through selected holes in the stencil representing the code key set with a predetermined sequence identification mark thereby to establish the sequence in which the code key set was marked in relation to the other sets, subsequently marking through selected holes in the stencil representing the amount key set with another predetermined sequence identification mark to establish the sequence in which the amount key set was marked, subsequently marking through selected holes in the stencil representing the operating key set with a further predetermined sequence identification mark to establish the sequence in which the operating key set was marked in the sequence being taught, and finally erasing the marking from the writing device.

References Cited

UNITED STATES PATENTS

| | | | |
|---|---|---|---|
| 1,614,390 | 1/1927 | Randall | 35—5 |
| 2,879,608 | 3/1959 | Watkins | 35—66 X |

EUGENE R. CAPOZIO, Primary Examiner

W. H. GRIEB, Assistant Examiner